US011062062B2

(12) United States Patent
Poux et al.

(10) Patent No.: US 11,062,062 B2
(45) Date of Patent: Jul. 13, 2021

(54) DIAGNOSTICS SYSTEM FOR A CHILLER AND METHOD OF EVALUATING PERFORMANCE OF A CHILLER

(71) Applicants: CARRIER CORPORATION, Palm Beach Gardens, FL (US); Damien Poux, Lyons (FR)

(72) Inventors: Damien Poux, Lyons (FR); Mikhail B. Gorbounov, South Windsor, CT (US); Mark Vogel, S. Glastonbury, CT (US); Shui Yuan, Simsbury, CT (US); Hayden M. Reeve, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 496 days.

(21) Appl. No.: 15/777,028

(22) PCT Filed: Nov. 19, 2015

(86) PCT No.: PCT/IB2015/002289
§ 371 (c)(1),
(2) Date: May 17, 2018

(87) PCT Pub. No.: WO2017/085525
PCT Pub. Date: May 26, 2017

(65) Prior Publication Data
US 2018/0373822 A1    Dec. 27, 2018

(51) Int. Cl.
*G06F 17/10*    (2006.01)
*G06F 30/20*    (2020.01)
(Continued)

(52) U.S. Cl.
CPC ............. *G06F 30/20* (2020.01); *F25B 49/02* (2013.01); *G05B 23/0254* (2013.01);
(Continued)

(58) Field of Classification Search
CPC ...... G06F 30/20; G06F 2111/10; F25B 49/02; F25B 2500/04; F25B 2500/19; G05B 23/0254
(Continued)

(56) References Cited

U.S. PATENT DOCUMENTS

| 4,390,058 A | 6/1983 | Otake et al. |
| 4,651,535 A * | 3/1987 | Alsenz ............... G05D 23/1913 62/225 |

(Continued)

FOREIGN PATENT DOCUMENTS

| CA | 2344908 A1 | 4/2001 | |
| CA | 2344908 A1 * | 1/2002 | ......... G05B 23/0243 |

(Continued)

OTHER PUBLICATIONS

Qureshi et al. "Performance degradation of a vapor compression refrigeration system under fouled conditions", 2011, International Journal of Refrigeration 34, pp. 1016-1027. (Year: 2011).*

(Continued)

*Primary Examiner* — Andre Pierre Louis
(74) *Attorney, Agent, or Firm* — Cantor Colburn LLP

(57) ABSTRACT

A method of evaluating performance of a chiller is provided. The method includes detecting a plurality of operating parameters of the chiller with a plurality of sensors. The method also includes individually determining a first coefficient of performance degradation due to condenser fouling. The method further includes individually determining a second coefficient of performance degradation due to condenser water flow reduction. The method yet further includes individually determining a third coefficient of performance degradation due to evaporator fouling. The method also includes determining a total coefficient of performance degradation of the chiller with a summation of (Continued)

the first, second and third coefficient of performance degradations.

10 Claims, 1 Drawing Sheet

(51) Int. Cl.
    *G05B 23/02* (2006.01)
    *F25B 49/02* (2006.01)
    *G06F 111/10* (2020.01)
(52) U.S. Cl.
    CPC ....... *F25B 2500/04* (2013.01); *F25B 2500/19* (2013.01); *G06F 2111/10* (2020.01)
(58) Field of Classification Search
    USPC .......................................................... 703/2
    See application file for complete search history.

(56) References Cited

U.S. PATENT DOCUMENTS

| | | | |
|---|---|---|---|
| 4,766,553 | A | 8/1988 | Kaya et al. |
| 4,768,346 | A | 9/1988 | Mathur |
| 5,083,438 | A | 1/1992 | McMullin |
| 5,539,382 | A | 7/1996 | Duff et al. |
| 5,677,677 | A | 10/1997 | Duff et al. |
| 5,911,127 | A | 6/1999 | Tulpule |
| 6,272,868 | B1 | 8/2001 | Grabon et al. |
| 6,438,981 | B1 | 8/2002 | Whiteside |
| 6,532,754 | B2 | 3/2003 | Haley et al. |
| 6,701,725 | B2 | 3/2004 | Rossi et al. |
| 6,973,410 | B2 | 12/2005 | Siegel |
| 7,455,099 | B2 | 11/2008 | Osborn et al. |
| 7,558,700 | B2 | 7/2009 | Yamashita et al. |
| 7,685,830 | B2 | 3/2010 | Thybo et al. |
| 7,827,006 | B2 | 11/2010 | Miller |
| 8,100,167 | B2 | 1/2012 | Thybo et al. |
| 8,121,818 | B2 | 2/2012 | Gorinevsky |
| 8,762,106 | B2 | 6/2014 | Miller |
| 8,800,309 | B2 | 8/2014 | Buda et al. |
| 8,812,263 | B2 | 8/2014 | Togano et al. |
| 8,965,748 | B2 | 2/2015 | Iyengar et al. |
| 9,115,921 | B2 | 8/2015 | Ueda et al. |
| 9,168,315 | B1 * | 10/2015 | Scaringe ................. F25B 49/02 |
| 2008/0027568 | A1 | 1/2008 | Pearson |
| 2011/0023503 | A1 | 2/2011 | Wang et al. |
| 2011/0130886 | A1 | 6/2011 | Drees et al. |
| 2013/0013121 | A1 | 1/2013 | Henze et al. |
| 2014/0200868 | A1 | 7/2014 | Motto |
| 2014/0229012 | A1 | 8/2014 | Chandan et al. |
| 2015/0052919 | A1 | 2/2015 | McGowan et al. |
| 2015/0134120 | A1 | 5/2015 | Sun et al. |

FOREIGN PATENT DOCUMENTS

| | | |
|---|---|---|
| CN | 1098512 C | 1/2003 |
| CN | 101253374 A | 8/2008 |
| CN | 102345951 A | 2/2012 |
| JP | 2000250624 A | 9/2000 |
| WO | 2014072085 A1 | 5/2014 |
| WO | 2014178926 A1 | 11/2014 |

OTHER PUBLICATIONS

Putnam et al. "The Measurement of Condenser Losses Due to Fouling and Those Due to Air Ingress", 2002, EPRI Condenser Seminar and Conference, 16 pages. (Year: 2002).*
Beitelmal et al. "Model-Based Approach for Optimizing a Data Center Centralized Cooling System", 2006, HP Laboratories Palo Alto HPL-2006-67, 21 pages. (Year: 2006).*
Beuthel, Carsten M. "Alarm Management for power generation", ABB 2012, 8 pages. (Year: 2012).*
Siddiqui et al. "Dew Point refrigeration systems: Normalized sensitivity analysis and impact of fouling", Mar. 20, 2015, International Journal of Refrigeration 55, pp. 60-71. (Year: 2015).*
McDonald, J.H., Handbook of Biological Statistics, 3rd. ed. 2014, Excerpt from content of pp. 229-237, 7 pages. (Year: 2014).*
Yu et al. "Using cluster and multivariate analyses to appraise the operating performance of a chiller system serving an institutional building", Energy and Buildings 44, 2012, pp. 104-113. (Year: 2012).*
Trane, Chiller System Design and Control Applications Engineering Manual, Nov. 2011, 113 pages. (Year: 2011).*
International Search Report regarding related App. No. PCT/IB2015/002289; dated Jun. 2, 2016; 6 pgs.
Written Opinion regarding related App. No. PCT/IB2015/002289; dated Jun. 2, 2016; 6 pgs.
Keir, et al.; Dynamic Modeling, Control, and Fault Detection in Vapor Compression Systems; ACRC TR-247; Aug. 2006; 185 pgs.
Sencan, et al., "Different methods for modeling adsorption heat transformer powered by solar pond," Energy Conversion and Management, Elsevier Science Publishers, Oxford, GB, vol. 48, No. 3; Jan. 23, 2007; 12 pgs.
Li, et al., "An overall performance index for characterizing the economic impact of faults in direct expansion cooling equipment," International Journal of Refrigeration 30; Science Direct, University of Nebraska-Lincoln, Jul. 7, 2006; 12 pgs.
Chinese Office Action for Application No. 201580084697.8; dated Aug. 12, 2020; 8 Pages.
Wang Ying, Zhang Yu-feng; "Analysis and Experiment of Dilatancy Technology of District Heating System with High-Temperature Hear Pump"; School of Environmental Science and Technology; Tianjin University; Tianjin, China (published on Nov. 30, 2012).

* cited by examiner

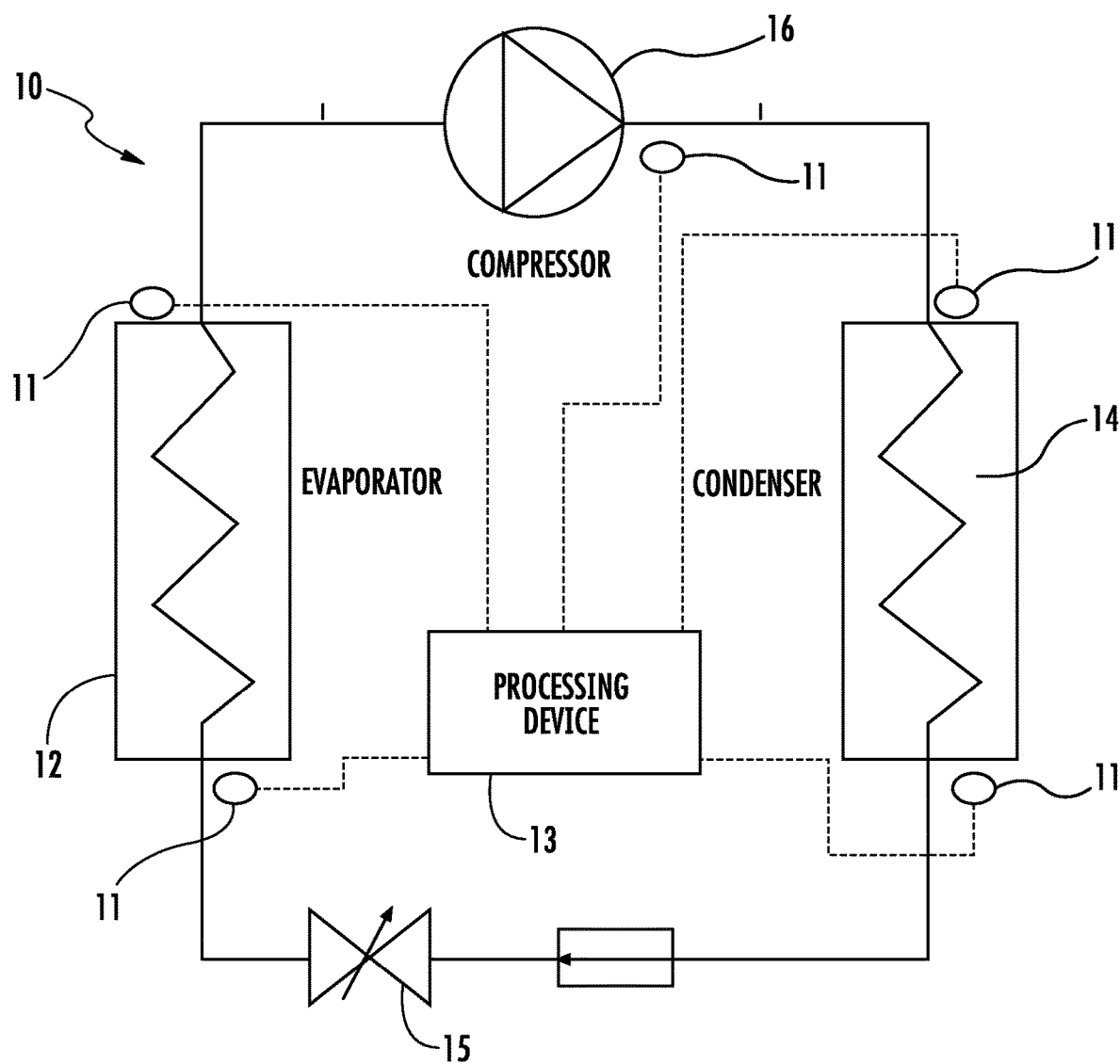

DIAGNOSTICS SYSTEM FOR A CHILLER AND METHOD OF EVALUATING PERFORMANCE OF A CHILLER

CROSS-REFERENCE TO RELATED APPLICATIONS

This preliminary amendment is submitted with the application for entry into the U.S. National Phase under Chapter I. This application is based on PCT/IB2015/002289 filed on Nov. 19, 2015, which is incorporated herein by reference in its entirety.

BACKGROUND OF THE DISCLOSURE

The embodiments herein generally relate to chillers and, more particularly, to a diagnostics system for a chiller, as well as a method of evaluating performance of a chiller.

Chiller faults adversely impact performance, cause energy to be poorly utilized and require additional servicing. Current chillers are generally serviced based on a time schedule rather than using diagnostics to determine that performance has degraded to the point where maintenance is required.

BRIEF DESCRIPTION OF THE DISCLOSURE

According to one embodiment, a method of evaluating performance of a chiller is provided. The method includes detecting a plurality of operating parameters of the chiller with a plurality of sensors. The method also includes individually determining a first term of coefficient of performance (COP) degradation due to condenser fouling. The method further includes individually determining a second term of COP degradation due to condenser water flow reduction. The method yet further includes individually determining a third term of COP degradation due to evaporator fouling. The method also includes determining a total COP degradation of the chiller with a summation of the first, second and third terms of COP degradations.

In addition to one or more of the features described above, or as an alternative, further embodiments may include that the first, second and third terms of COP degradations are determined with a first reduced order model, a second reduced order model and a third reduced order model, respectively, the first, second and third reduced order models determined with multiple regression analysis.

In addition to one or more of the features described above, or as an alternative, further embodiments may include that the plurality of operating parameters comprises a condenser saturation pressure, a condenser exit cooling water temperature, a compressor speed, a condenser water temperature difference, an evaporator temperature, and an evaporator water temperature difference.

In addition to one or more of the features described above, or as an alternative, further embodiments may include that the first reduced order model is based on the condenser saturation pressure and the condenser exit cooling water temperature.

In addition to one or more of the features described above, or as an alternative, further embodiments may include that the first reduced order model includes a plurality of constants, the plurality of constants determined during an installation of the chiller and updated during maintenance of the chiller.

In addition to one or more of the features described above, or as an alternative, further embodiments may include that the second reduced order model is based on the condenser water temperature difference and the compressor speed.

In addition to one or more of the features described above, or as an alternative, further embodiments may include that the second reduced order model includes a plurality of constants, the plurality of constants determined during an installation of the chiller and updated during maintenance of the chiller.

In addition to one or more of the features described above, or as an alternative, further embodiments may include that the third reduced order model is based on the evaporator temperature and the compressor speed.

In addition to one or more of the features described above, or as an alternative, further embodiments may include that the third reduced order model includes a plurality of constants, the plurality of constants determined during an installation of the chiller and updated during maintenance of the chiller.

In addition to one or more of the features described above, or as an alternative, further embodiments may include generating an alert if the total COP degradation exceeds a predetermined threshold for a predetermined amount of time.

In addition to one or more of the features described above, or as an alternative, further embodiments may include that a low level alert is generated if a first threshold is exceeded and a high level alert is generated if a second threshold is exceeded, the second threshold being greater than the first threshold.

According to another embodiment, a diagnostics system for a chiller is provided. The diagnostics system includes a plurality of sensors for detecting a plurality of operating parameters of the chiller. The diagnostics system also includes a processing device receiving the plurality of operating parameters detected by the sensors, the processing device individually determining a first term of COP degradation, a second term of COP degradation, and a third term of COP degradation, wherein the first term of COP degradation is due to condenser fouling, the second term of COP degradation is due to condenser water flow reduction, and the third term of COP degradation is due to evaporator fouling, the processing device determining a total coefficient of performance degradation of the chiller with a summation of the first, second and third coefficient of performance degradations.

In addition to one or more of the features described above, or as an alternative, further embodiments may include that the processing device is integrated with a chiller controller.

In addition to one or more of the features described above, or as an alternative, further embodiments may include that the processing device is located remote from a chiller controller on a server.

In addition to one or more of the features described above, or as an alternative, further embodiments may include an alert generator that generates an alert if the total COP degradation exceeds a predetermined threshold for a predetermined amount of time.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

FIG. 1 is a schematic illustration of a circuit of a chiller.

DETAILED DESCRIPTION OF THE DISCLOSURE

Referring to FIG. 1, a chiller system 10 is illustrated and includes an evaporator unit 12, a condenser unit 14, and a compressor unit 16. The compressor unit 16 includes a motor (not shown) associated therewith. The motor, when activated, will cause the compressor unit 16 to compress entering refrigerant vapor from the evaporator unit 12. Refrigerant leaving the compressor unit 16 will enter the condenser unit 14 before passing through a flow control metering device 15 to the evaporator unit 12. The liquid refrigerant in the evaporator unit 12 chills water being pumped through a conduit via a chilled water pump. The chilled water in the conduit exits the evaporator unit 12 for circulation through appropriate cooling devices before returning to the evaporator unit 12 for further chilling.

The chiller system 10 is equipped with a plurality of sensors 11 configured to detect various operating parameters of the chiller system 10. For example, the sensors 11 are capable of detecting operating parameters associated with condenser saturation pressure, condenser exit cooling water temperature, compressor speed, condenser water temperature difference, evaporator temperature, and evaporator water temperature difference. The water differences referred to above are defined as the difference between an inlet water temperature and an outlet water temperature for the respective units. These are merely illustrative operating parameters that may be detected. Additional operating parameters, such as water flow rate may be detected, for example.

The detected operating parameters are employed to determine a total coefficient of performance degradation of the chiller unit 10, as described herein. In particular, multiple individual performance degradation contributors are determined and then summed to ascertain the total coefficient of performance degradation. The individual contributors are referred to herein as individual coefficients of performance degradation, such as a first, second and third coefficient of performance degradation, for example. The terms "first coefficient of performance degradation," "second coefficient of performance degradation," and third coefficient of performance degradation" are also referred to herein as "first term of COP degradation," "second term of COP degradation," and "third term of CO degradation." The individual coefficients of performance degradation are related to fouling and water flow reduction faults. Compact embedded algorithms are programmed on a processing device 13 that is located in an integrated manner with a chiller controller or located remotely on a server.

The models (e.g., algorithms) are defined below and were formulated with multiple linear regression analysis. The coefficients within each algorithm are typically derived from a physics based model of the chiller unit 10. The physics based models are rather complex and can require significant computation time and dedicated computers to provide data on a single set of conditions in the chiller. These models were exercised for multiple hours, covering a wide range of operating and fault conditions. The output from these models was compiled into a database. The database was analyzed to formulate and select the features which could support the required efficient and compact reduced order models. The final models were created from a multiple regression process which is designed to discover the feature combinations and weights which minimize the predictive discrepancies (predictive errors) between the final reduced order models and the results from the complex physics models. This process resulted in final models which are compact enough to embed in chiller controller and which can produce results quickly to be able to provide real time alerts. The coefficients found from a physics based model are tuned during initial installation of the chiller unit 10 and may be adjusted based on observed performance during future maintenance. If a physics based model is not available or not utilized for some other reason, the initial installation data may be relied upon to determine and set the coefficients. The models are largely independent of each other to identify individual faults under consideration.

The first term of coefficient of performance degradation refers to chiller performance degradation from condenser fouling and is represented by the following equation which is also referred to herein as a first reduced order model:

$$COPdegCondFouling=w1*C\_P+w2*C\_LCWT+w3*Speed+w4$$

where w1-w4 are constants determined during chiller initial installation and updated during maintenance, C_P is a condenser saturation pressure, and C_LCWT is a leaving condenser cooling water temperature.

The second term of coefficient of performance degradation refers to chiller performance degradation from condenser water flow reduction or fractional water flow (also referred to herein as "water reduction fraction") and is represented by the following equation which is also referred to herein as a second reduced order model:

$$COPdegCondWR=w5*C\_dCWT+w6*Speed+w7$$

where w5-w7 are constants determined during chiller initial installation and updated during maintenance, C_dCWT is condenser delta cooling water temperature, and Speed is a speed of the compressor.

The third term of coefficient of performance degradation refers to chiller performance degradation from evaporator fouling and is represented by the following equation which is also referred to herein as a third reduced order model:

$$COPdegEvapFouling=w8*E\_Pinch+w9*Speed+w10$$

where w8-w10 are constants determined during chiller initial installation and updated during maintenance, E_Pinch is an evaporator Pinch, and Speed is a speed of the compressor.

Additional models for condenser fouling factor representing the degree of fouling in the condenser, water reduction fraction and evaporator fouling factor representing the degree of fouling in the evaporator are represented by the following:

$$CondFoulingF=w11*C\_P+w12*C\_LCWT+w13*Speed+w14$$

$$CondWR=w15*(1/C\_dCWT)+w16*Speed+w17$$

$$EvapFoulingF=w18*E\_Pinch+w19*Speed+w20$$

$$EvapWR=w21*(1/E\_dCHWT)+w22*Speed+w23$$

where: w11-w23 are constants determined during chiller initial installation and updated during maintenance and E_dCHWT is an evaporator delta chilled water temperature.

The performance degradation due to condenser fouling, condenser water reduction and evaporator fouling can be summed to provide an estimate of overall performance degradation. Therefore, the first, second and third term of coefficient of performance degradation are utilized to estimate the total coefficient of performance degradation. The summation is shown as follows:

$$Total\ COP\ degradation=COPdegCondFouling+COPdegCondWR+COPdegEvapFouling$$

The total COP degradation is compared to at least one threshold by the processing device to determine if a maintenance alert is required. In some embodiments, a single threshold is compared against the total COP degradation. In other embodiments, a plurality of thresholds is programmed in the processing device. For example, a first, lower threshold may be utilized to trigger a low-level alert, while a second, higher threshold may be utilized to trigger a more urgent alert. A persistence filter is applied after COP degradation computation by looking for persistence of a high alert of a specified time period, such as several hours. The high alert persistence can then provide an initial indication that maintenance would significantly improve chiller performance.

The calculated fouling factors (i.e., condenser fouling and evaporator fouling discussed above) and water reduction fraction together with associated COP reduction terms can serve as an indication of what corrective action (heat exchanger cleaning or water flow correction) should be performed to improve chiller performance.

The system and method described herein is applicable for both constant and variable flow situations when a reference water flow is known.

Advantageously, the embodiments described herein reduce chiller operational costs associated with delayed fault determination and reduce maintenance time and costs by pre-identifying faults before a field visit.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of evaluating performance of a chiller comprising:
    operating the chiller, the chiller comprising a compressor unit, condenser unit, flow control metering device and an evaporator unit;
    detecting a plurality of operating parameters of the chiller with a plurality of sensors;
    individually determining a first term of coefficient of performance (COP) degradation due to condenser fouling;
    individually determining a second term of COP degradation due to condenser water flow reduction;
    individually determining a third term of COP degradation due to evaporator fouling;
    determining a total COP degradation of the chiller with a summation of the first, second and third terms of COP degradations;
    performing at least one of (i) completing installation of the chiller in response to the total COP degradation and (ii) initiating maintenance of the chiller in response to the total COP degradation;
    wherein the first, second and third terms of COP degradations are determined with a first reduced order model, a second reduced order model and a third reduced order model, respectively, the first, second and third reduced order models determined with multiple regression analysis.

2. The method of claim 1, wherein the plurality of operating parameters comprises a condenser saturation pressure, a condenser exit cooling water temperature, a compressor speed, a condenser water temperature difference, an evaporator temperature, and an evaporator water temperature difference.

3. The method of claim 1, wherein the first reduced order model is based on a condenser saturation pressure and a condenser exit cooling water temperature.

4. The method of claim 3, wherein the first reduced order model includes a plurality of constants, the plurality of constants determined during an installation of the chiller and updated during maintenance of the chiller.

5. The method of claim 1, wherein the second reduced order model is based on a condenser water temperature difference and a compressor speed.

6. The method of claim 5, wherein the second reduced order model includes a plurality of constants, the plurality of constants determined during an installation of the chiller and updated during maintenance of the chiller.

7. The method of claim 1, wherein the third reduced order model is based on an evaporator temperature and a compressor speed.

8. The method of claim 7, wherein the third reduced order model includes a plurality of constants, the plurality of constants determined during an installation of the chiller and updated during maintenance of the chiller.

9. The method of claim 1, further comprising generating an alert if the total COP degradation exceeds a predetermined threshold for a predetermined amount of time.

10. The method of claim 9, wherein a low level alert is generated if a first threshold is exceeded and a high level alert is generated if a second threshold is exceeded, the second threshold being greater than the first threshold.

* * * * *